United States Patent Office 3,356,642
Patented Dec. 5, 1967

3,356,642
POLYOLEFIN STABILIZED WITH A SALT OF A PIPERAZINE-ALKANOIC ACID
Salvatore Algieri, Rome, Italy, assignor to Montecatini Edison S.p.A., Milan, Italy, a corporation of Italy
No Drawing. Filed Jan. 26, 1965, Ser. No. 428,220
Claims priority, application Italy, Jan. 27, 1964,
1,691/64, 1,692/64
10 Claims. (Cl. 260—45.75)

ABSTRACT OF THE DISCLOSURE

Dye-receptive, lightfast polyolefin composition comprising a crystalline polymeric olefin and 0.1 to 10% by weight of the composition of a metal compound having the formula

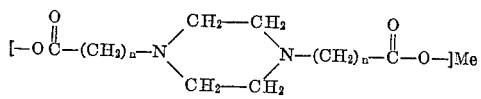

wherein Me is a metal selected from the group consisting of the metals of Group II–B and Group VIII of the Mendeleef Periodic Table and $n$ is 1 or 2.

---

The present invention relates to the preparation of textile fibers, films, tapes and other manufactured shaped articles based essentially on crystalline polyolefins which are particularly receptive to disperse dyestuffs of normal and of phenolic type.

More particularly the present invention relates to the preparation of light-stable and dyeable textile fibers and shaped articles formed by extrusion of crystalline polyolefins having mixed therewith metal derivatives of piperazine alkanoic acids.

As the polyolefin, polypropylene consisting essentially of isotactic macromolecules, obtained by stereospecific polymerization of propylene, is preferably used. Other polyolefins which can be used in accordance with the present invention are those obtained by polymerization of olefins having the formula $RCH=CH_2$, in which R is hydrogen or an alkyl or aryl radical, such as polyethylene, polybutene-1, poly-4-methyl-pentene-1, polystyrene and the like and which, when R is alkyl or aryl, exhibit isotatic structure and isotatic type crystallinity.

Methods for modifying the receptivity for dyestuffs of fibers of polypropylene consisting at least prevailingly of isotactic macromolecules have been described. Such methods involve the addition of various substances capable of modifying the dyeability of the fibers to the polypropylene prior to spinning the same.

One object of the present invention is the preparation of textile fibers, films, tapes and shaped articles which are highly stable to light.

Another object of the invention is to provide a process for preparing fibers and shaped articles generally comprising alpha-olefin polymers and having a particular receptivity to disperse dyestuffs of normal and phenolic type and to reactive dyestuffs and which are exceptionally stable to light.

A further object of the invention is to provide shaped articles, including fibers, films, tapes, etc., which are dyed to fast, solid colors by the dyestuffs mentioned.

These and other objects are achieved by the present invention in accordance with which a poly(alpha-olefin) as described herein is mixed with 0.1–10% by weight of a metal compound obtained by reacting an acid having the formula:

in which $n$ is 1 or 2, with a salt of a metal of Group II–B or Group VIII of the Periodic Table according to Mendeleef, and the mixture is formed into the article of desired shape.

The compounds of said acids with said metal salts which are used for the tinctorial modification of the polymers according to the present invention can be synthesized by reacting a piperazine-alkanoic acid or a derivative thereof (such as an ester, salt, acid chloride, etc.) with a salt of the Group II–B or VIII metal.

The reaction is carried out, preferably, in aqueous solution or in organic solvents and, also preferably, by heating the mixtures of the reactants.

The reaction products thus obtained are isolated in any convenient way, as by precipitation, evaporation of the solvent, and the like.

The following piperazine-alkanoic acids and their derivatives are particularly suitable for use in practicing this invention:

piperazin-dipropionic acid and its derivatives (such as esters, acid chlorides)
piperazin-diacetic acid and its derivatives.

In addition to piperazine-alkanoic acids, alkyl piperazine-alkanoic acids are suitable for use in practicing the invention.

In general, the addition of the metal compound to the polymeric (alpha-olefin) is carried out by simply mixing the metal compound with the polymer, with continued agitation.

However, the composition to be spun or otherwise formed into the dyeable shaped articles can be obtained by other methods, such as by mixing the polymeric alpha-olefin with a solution of the metal compound in a suitable solvent, followed by evaporation of the solvent, or by adding the metal compound to the polymeric alpha-olefin at the end of the polymerization run which results in production thereof.

It is possible, also, to apply the metal compound to the manufactured article, e.g., by immersing the article in a solution or dispersion of the metal compound and then evaporating the solvent. In the case of yarns, the application can be carried out before or after stretching, for times varying from a few seconds to several hours, at temperatures from room temperature to 10° C. below the softening point of the polymer.

When the dyeing modifier is mixed with the poly(alpha-olefin) prior to shaping the latter, the mixtures are granulated and may then be extruded through a melt spinning device preferably of the type described in Italian Patent No. 614,043, and preferably, also, through spinnerets of the type described in the U.S. patent application No. 229,267 filed Oct. 3, 1962, by A. Coen et al., now abandoned and having holes with a length/diameter ratio higher than 1.

The granulation and spinning are carried out by operating in the absence of oxygen, preferably under an atmosphere of inert gas, e.g., nitrogen.

The spinning of the mixes is conveniently carried out in the presence of a small amount of a solid dispersing agent.

Adjuvants, such as opacifiers, organic or inorganic pigments, and compounds which serve to stabilize the polymer against the action of light, heat and aging can be incorporated in the composition during the mixing of the poly(alpha-olefin) and metal compound as defined herein.

The fibers, after spinning are subjected to a stretching process, with stretching ratios between 1:2 and 1:10, at temperatures between 80 and 150° C. in stretching devices heated by means of hot air, steam or a similar fluid or provided with a heating plate.

The stretched fibers can be dimensionally stabilized under free-to-shrink conditions or under conditions of controlled shrinkage, at 80–160° C. and as described in U.S. Patent No. 3,106,442.

Mono- or multifilaments can be obtained by extrusion of the composition comprising the poly(alpha-olefin) and metal compound as defined herein. The filaments can be used for preparing continuous or staple yarns or for preparing bulky yarns or staple.

The compositions of the present invention can be used not only for preparing yarns but also for preparing fibers, tapes, shaped articles and the like.

The fibers and shaped articles of the invention have remarkably good receptivity for disperse dyestuffs of normal and phenolic type, and have improved stability, more particularly to light.

The fastness to light, washing, washing with trichloroethylene and rubbing of the colors obtained is very satisfactory.

The melt index values given in the examples below were determined according to ASTM 1238-57 at a temperature of 250° C. with a load of 2.160 g. on laminae having a thickness of 1 mm. and comprising polypropylene consisting at least prevailingly of isotactic macromolecules plus an amount of metal compound as defined herein such that the final mixture contained 0.1% of metal.

The melt index was determined either immediately after shaping of the laminae or after holding the laminae at 300° C. for 15 minutes in a Carver press.

The melt index of the initial lamina is compared with the melt index of the lamina kept at 300° C. for 15 minutes. Without the metal additive, the laminae per se, kept at 300° C. for 15 minutes, have a melt index of 15–16 (for a polymer of the same batch).

The purification of the fibers referred to in the examples was accomplished by purging the fibers with a solution of Diapon T (sodium N-oleyl-N-methyl-taurinate) (2 g./l.) and sodium carbonate (1 g./l.) at 60° C. for 20–30 minutes, and thereafter rinsing the fibers carefully with running water.

When chelating dyestuffs of the olefin and naprolene classes are used, the dyestuffs are prepared by kneading them with an equal weight of a 10% solution of Dispergal O (condensation product of ethylene oxide with ricinoleic acid) (trademark for an alkyl phenol-ethylene oxide condensate), and adding warm water to the desired volume.

The dyeings are carried out with a fiber/dyebath ratio of 1:30.

In carrying out the dyeing operation, water is heated to 40° C., and 6% of Dispergal O and 2% (by weight of the fibers) of a 56% acetic acid solution to give a pH of 3.5–4 are added. The fibers are immersed in the aqueous medium thus prepared and after 15–20 minutes the dyestuff is added and the dyebath is heated to the boiling point within 45 minutes. It is then kept at the boiling point for 60–90 minutes. The dyed fibers are washed with a 2% solution of Dispergal O for 20 minutes at 95° C. and then rinsed with running water.

When chelating dyestuffs of the Mayfon class (produced by Otto B. May) (See Man Made Text., vol. 40, No. 463, January 1963, page 42) are used, the fibers/dyebath ratio is also preferably 1:30.

When disperse dyestuffs are used, a fiber/dyebath ratio of 1:30 is also suitable.

The dyeing is carried out as follows:

Water is heated to 40° C., the fibers are introduced, the dispersion of dyestuff in water is added, and the dyebath is heated to the boiling point and kept at the boiling temperature for 60 minutes.

The dyed fibers are washed with a solution containing 1 cc./l. of a surface active agent such as Aionico SCL (trademark for a fatty alcohol-ethylene oxide condensate for 20 minutes at 40° C. and then rinsed with running water.

*Normal disperse dyestuffs*

Setacyl yellow 3G (C.I. disperse yellow 20) (Geigy)
Cibacet scarlet BR (C.I. disperse red 18) (Ciba)
Setacyl brilliant blue BG (C.I. disperse blue 3) (Geigy)
Duranol brilliant yellow 6G (C.I. 58,900) (I.C.I.)
Dispersol solid orange G (C.I. 11,005) (I.C.I.)
Artisil direct orange 2R (C.I. 11,005) (Sandoz)

With the basic cationic dyestuffs, the preferred fiber/dyebath ratio is also 1:30.

The bath was acidified with 2% (by weight of the fibers) of 56% acetic acid solution, 1% of Dispergal O was added, and the fibers were introduced.

The dyestuff was added and the dyebath was heated to the boiling point. The dyeing was continued at the boiling temperature for 60 minutes.

The dyed fibers were washed with a solution containing 1 cc./l. of Aionico SCL for 20 minutes at 40° C.

The following dyestuffs were used in the tests:

Neorlin green JIOb
malachite green crystals
Astrazon blue G
Sevron brilliant red 4G
Astrazon red 6B The values for the color fastnesses were determined according to the following specifications:

|  | Specification |
| --- | --- |
| Washing A fastness | Unitex-9 |
| Washing B fastness | Unitex-10 |
| Fastness to washing with trichloroethylene | Unitex-14 |
| Fastness to perspiration | Unitex-13 |
| Fastness to rubbing | Unitex-15 |

In the spinning tests reported in the following examples, polypropylene consisting essentially of isotactic macromolecules and having the following characteristics was used:

Intrinsic viscosity (determined in tetrahydronaphthalene at 135° C.) _____ 1.56
(Corresponding to a melt index—12)
Ash content _____percent__ 0.015
Residue after heptane extraction _____do____ 96.2

The following examples illustrate the invention without limiting its scope.

*Example 1*

The following reactants are introduced into a 3-liter three-necked flask provided with agitator, thermometer and reflux condenser:

Methyl - N,N' - piperazinedipropionate (1.42 mols) _____g__ 369
Zn$^{(++)}$ acetate, tetrahydrate (1.42 mols) _____g__ 312
Water _____cc__ 1500

The reaction is carried out at the reflux temperature for 3 hours.

The product obtained is isolated by partially removing the solvent by distillation. An amount of solvent equal to that distilled off is added and the solution is distilled until a dry product is obtained. It is purified by washing with methanol and dried.

The product, for which the following formula is indicated

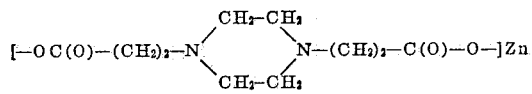

is a colorless solid having a melting point of about 235° C. It is soluble in water and insoluble in the common organic solvents.

The analysis shows the following results:

Zn=16.14% (calculated for $C_{10}H_{16}O_4N_2Zn$=22.4%)
N=7.8% (calculated for $C_{10}H_{16}O_4N_2Zn$=9.55%)

A mixture of the zinc derivative with the polypropylene (containing 0.1% of zinc) gives the following variations in melt index:

Melt index of the starting lamina _____ 2.9
Melt index of the lamina after 15 minutes at 300° C. _____ 4.3
(Melt index in the absence of metal derivative—15 to 16)

The use of the zinc derivative, therefore, retards degradation of the polypropylene during the processing.

93 g. of the dyeing modifier (zinc derivative) are mixed with 9.907 kg. of the polypropylene at room temperature in a Henschel-type mixer.

The mixture is granulated in an extruder under an oxygen-free atmosphere at 200° C.

The granulated composition is spun in a melt spinning device under the following conditions:

Spinning conditions:
    Screw temperature _____° C__ 250
    Head temperature _____° C__ 245
    Spinneret temperature _____° C__ 245
    Spinneret type _____mm__ 60/0.8 x 16
    Max. pressure (kg./cm.²) _____ 71
    Winding speed (m./min.) _____ 510
Stretching conditions:
    Temperature _____° C__ 130
    Medium _____ Steam
    Stretching ratio _____ 1:5

After being stretched, the fibers have the following characteristics:

Tenacity _____g./den__ 5.5
Elongation _____percent__ 28

The fibers have good receptivity for disperse dyestuffs and show excellent color fastness when aged with those dyes.

The fibers can be exposed to direct sunlight for 250 hours without becoming brittle, whereas fibers of polyproylene per se may become brittle after 150 hours of exposure.

*Example II*

The following compounds are introduced into a 3-liter three-necked flask provided with an agitator, a thermometer and a reflux condenser:

N,N'-piperazinedipropionic acid (1 mole) ____g__ 230.2
Zn$^{(++)}$ acetate dihydrate (1 mole) _____g__ 219.5
Water _____cc__ 1500

The reaction is carried out under reflux conditions for 3 hours.

The product formed is isolated by partially removing the solvent by distillation; a solvent amount corresponding to that distilled off is then added and the whole is distilled until a dry product is obtained. It is purified by washing with methanol and dried.

A product having characteristics similar to those of the product of Example I is obtained.

*Example III*

A mixture of 1.24 g. of ZnO, 3.94 g. of methyl piperazinedipropionate and 994.82 g. of polypropylene consisting essentially of isotactic macromolecules (said mixture thus contains 0.1% of zinc) shows the following variations in melt index:

Melt index of the starting lamina _____ 3.9
Melt index of the lamina after 15 minutes at 300° C. _____ 6.0
(Melt index in the absence of ZnO and of methyl-piperazinedipropionate—15 to 16)

An improvement in the resistance of the polypropylene to degradation during processing is obtained.

The mixture is granulated in an extruder, under an oxygen-free atmosphere, at 230° C. The granulated composition is spun in a melt spinning device under the following conditions:

Spinning conditions:
    Screw temperature _____° C__ 260
    Head temperature _____° C__ 280
    Spinneret temperature _____° C__ 260
    Spinneret type _____mm__ 60/0.8 x 16
    Max. pressure (kg./cm.²) _____ 90
    Winding speed (m./minute) _____ 500
Stretching conditions:
    Temperature _____° C__ 130
    Medium _____ Steam
    Stretching ratio _____ 1:5

The fibers obtained have a good receptivity for disperse dyestuffs, and show excellent color fastness when dyed with those dyes.

Fibers containing only ZnO or only methylpiperazinedipropionate are not dyeable with chelating dyestuffs of the olefin and naprolene classes.

*Example IV*

The following compounds are introduced into a 3-liter three-necked flask provided with agitator, thermometer and reflux condenser:

Methyl-N,N'-piperazinedipropionate (0.73 mol)
_____g__ 188.00
Ni$^{(++)}$ acetate, tetrahydrate (0.73 mol) ____g__ 181.00
Water _____cc__ 1000.00

The reaction is carried out at 100° C. for 8 hours.

The reaction product is isolated by distilling off the solvent. It is then purified by washing with warm methanol and dried.

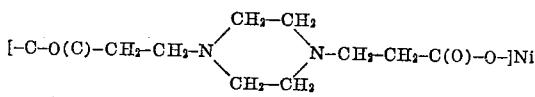

and is a light green solid. It is infusible at tempeatrures up to 250° C., insoluble in the common organic solvents, and soluble in acetic acid.

The analysis gives the following results:

Ni=18.9% (calculated for NiC$_{10}$H$_{16}$O$_4$N$_2$=20.4%)
N=9.15% (calculated for NiC$_{10}$H$_{16}$O$_4$N$_2$=9.8%)

A mixture of nickel derivative with polypropylene (containing 0.1% of nickel) shows the following variations in melt index:

Melt index of the starting lamina _____ 3.3
Melt index of the lamina after 15 minutes
  at 300° C. _____ 7.4
(Melt index in the absence of metal derivative—15 to 16)

The nickel derivative increases the stability of the composition to degradation during the processing.

58 g. of the nickel derivative are mixed with 10.804 kg. of the polypropylene together with 66 g. of didodecoyl thiodiglycolate, 33 g. of calcium stearate and 22 g. of TiO$_2$ at room temperature in a Henschel type mixer.

The mix is granulated in an extruder in an oxygen free atmosphere at 230° C.

The granulated composition is spun in a melt spinning device under the following conditions:

Spinning conditions:
    Screw temperature _____° C__ 240
    Head temperature _____° C__ 235
    Spinneret temperature _____° C__ 235
    Spinneret type _____mm__ 60/0.8 x 16
    Max. pressure (kg./cm.²) _____ 70
    Winding speed (m./minute) _____ 500
Stretching conditions:
    Temperature _____° C__ 130
    Medium _____ Steam
    Stretching ratio _____ 1:5

After stretching thereof, the fibers have the following characteristics:

Tenacity (g./den.) _____ 5.2
Elongation (percent) _____ 27

By analysis, the fibers show a nickel content of 0.09%.

The fibers are receptive to disperse dyestuffs.

The fibers can be exposed to direct to direct sunlight for 250 hours without becoming brittle, whereas fibers of polypropylene per se may become brittle after an exposure of 150 hours.

*Example V*

The following compounds are introduced into a 3-liter three-necked flask provided with agitator, thermometer and reflux condenser:

Methyl-N,N'-piperazinedipropionate (0.94 mol)
 g__ 243
Cobalt(++) acetate tetrahydrate (0.94) _____g__ 234
Water _____cc__ 1000

The reaction is carried out at the boiling point for 5 hours.

The product is isolated by distilling off the solvent and acetic acid formed during the reaction; in order to facilitate the removal of acetic acid, a small portion of water is added incrementally to the reaction vessel.

The reaction product is purified by washing with methanol at room temperature and dried.

It occurs as a brick-red solid having a melting point of 235–245° C. It is partially soluble in water and insoluble in the common organic solvents.

The analysis shows the following results:

Cobalt: 21.7% (calculated for $CoC_{10}H_{16}O_4N_2 = 20.6\%$)

69 g. of said reaction product are mixed with 9.881 kg. of the polypropylene, together with 60 g. of didodecoyl thiodiglycolate, 30 g. of calcium stearate and 20 g. of $TiO_2$, at room temperature in a Henschel type mixer.

The mixture is granulated in an extruder under an oxygen-free atmosphere at 230° C.

The granulated composition is spun in a melt spinning device under the following conditions:

Spinning conditions:
  Screw temperature _____° C__ 250
  Head temperature _____° C__ 250
  Spinneret temperature _____° C__ 240
  Spinneret type _____mm__ 60/0.8 x 16
  Max. pressure (kg./cm.²) _____ 67
  Winding speed (m./min.) _____ 500

Stretching conditions:
  Temperature _____° C__ 130
  Medium _____ Steam
  Stretching ratio _____ 1:5

After stretching thereof, the fibers have the following characteristics:

Tenacity (g./den.) _____ 5.15
Elongation (percent) _____ 28

The fibers obtained have a good receptivity for disperse dyestuffs. The fibers exhibit excellent color fastness when dyed with the dyestuffs mentioned.

*Example VI*

A granular mixture consisting of 99.31 g. of polyethylene terephthalate and 0.69 g. of the cobalt derivative of Example V is spun in a laboratory spinning device (heated cylinder, piston and spinneret).

The polyethylene terephthalate has an intrinsic viscosity of 0.61 (determined in O-chlorophenol at 20° C.).

The spinneret used has a hole with a diameter of 0.8 mm. and a length of 16 mm. and the spinning is carried out under a nitrogen head.

Using dyeing conditions as disclosed hereinabove, the fibers obtained are dyed to intense solid colors by normal disperse dyestuffs.

*Examples VII–XI*

These examples, illustrating the results obtained with mixtures of polypropylene consisting essentially of isotactic macromolecules and metal derivatives which are known from the technical literature and can be purchased on the market, show that not all organic metal compounds can be used in practicing this invention or for accomplishing the objects thereof.

The metal derivatives are used in an amount such that the final composition contains 0.1% of metal.

The metal compounds used and the characteristics of the polypropylene-metal compound compositions are shown in the table below.

TABLE

| Example | Metal additive | Melt Index on shaped laminae | Melt Index on laminae kept at 300° C. for 15 minutes | Color of the fibers | Dyeability with chelating dyestuffs (olefin and naprolene) |
|---|---|---|---|---|---|
| VII | Nickel-thiobis-octyl-phenol-phenolate. | 4.90 | Too high to be determinable. | Gray-black | Yes. |
| VIII | Complex of butylamine and nickel-thiobis-octylphenate. | 4.40 | 84.4 | Black-green | Yes. |
| IX | Nickel-thiobis-octylphenate. | 4.3 | Not determinable. | Gray-black | Yes. |
| X | Nickel-N,N'-dibutyl-dithiocarbamate. | 3 | 16.7 | Green-black | No. |
| XI | Zinc-N,N',dibutyl-dithiocarbamate. | 3.4 | 23 | White | No. |

From the data reported in the table, it appears that the additives used in Examples VII to IX will cause a remarkable degradation of the polypropylene and result in fibers having a grayish color which therefore are not acceptable for certain textile uses.

The additives used in Examples X and XI are not suitable in practicing the invention since the polypropylene fibers obtained are not receptive to dyestuffs of the chelating type (Olefin and Naprolene classes).

Various modifications and variations can be made in details in practicing the invention without departing from the spirit thereof. It is intended, therefore, to include in the scope of the appended claims all such variations and modifications as will be apparent to those skilled in the art from the description and detailed working examples given herein.

What is claimed is:

1. A dye-receptive, lightfast polyolefin composition comprising a mixture of (1) a crystalline polymeric olefin and (2) from 0.1 to 10% by weight of the mixture of a metal compound having the formula:

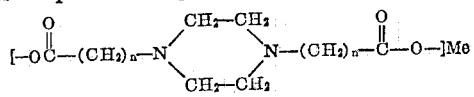

wherein Me is a metal selected from the group consisting of the metals of Group II-B and Group VIII of the Mendeleef Periodic Table and $n$ is 1 or 2, said articles being stable to light and particularly receptive to disperse dyestuffs of the normal and phenolic types.

2. The composition of claim 1 wherein the crystalline polymeric olefin (1) is polypropylene consisting at least prevailingly of isotactic macromolecules.

3. The composition of claim 1 wherein $n$ is 2 and Me is nickel.

4. The composition of claim 1 wherein $n$ is 2 and Me is cobalt.

5. The composition of claim 1 wherein $n$ is 2 and Me is zinc.

6. The composition of claim 1 wherein $n$ is 1 and Me is nickel.

7. The composition of claim 1 wherein $n$ is 1 and Me is cobalt.

8. The composition of claim 1 wherein $n$ is 1 and Me is zinc.

9. Textile fibers, filaments and yarns comprising the composition of claim 1.

10. Textile fibers, filaments and yarns comprising the composition of claim 2.

References Cited

UNITED STATES PATENTS

| 3,112,319 | 10/1963 | Tetenbaum et al. | 260—268 |
| 3,119,825 | 1/1964 | Tetenbaum et al. | 260—268 |
| 3,158,387 | 11/1964 | Stewart | 260—45.8 |
| 3,186,993 | 6/1965 | Knapp | 260—268 |

DONALD E. CZAJA, *Primary Examiner.*

V. HOKE, *Assistant Examiner.*

UNITED STATES PATENT OFFICE
CERTIFICATE OF CORRECTION

Patent No. 3,356,642                        December 5, 1967

Salvatore Algieri

It is hereby certified that error appears in the above numbered patent requiring correction and that the said Letters Patent should read as corrected below.

Column 1, line 46, for "tatic structure and isotatic" read -- tactic structure and isotactic --; column 3, line 55, for "wtihin" read -- within --; line 73, for "condensate" read -- condensate) --; column 6, lines 35 to 39, the formula should appear as shown below instead of as in the patent:

The reaction product has the structure:

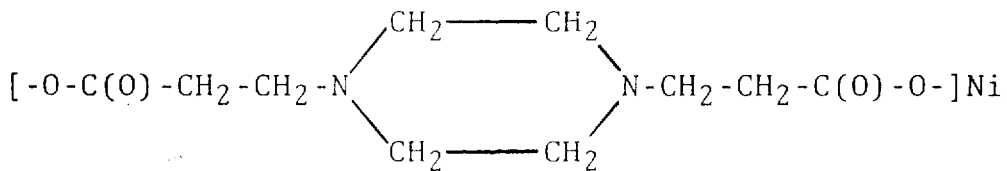

same column 6, line 40, for "tempeatures" read -- temperatures --; column 7, line 7, for "exposed to direct to direct sunlight" read -- exposed to direct sunlight --.

Signed and sealed this 18th day of February 1969.

(SEAL)
Attest:

EDWARD M. FLETCHER, JR.                      EDWARD J. BRENNER
Attesting Officer                            Commissioner of Patents